(12) United States Patent
Ogawa

(10) Patent No.: US 11,233,941 B2
(45) Date of Patent: Jan. 25, 2022

(54) ELECTRONIC DEVICE THAT RECEIVES LINE OF SIGHT INPUT, METHOD OF CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/078,590

(22) Filed: Oct. 23, 2020

(65) Prior Publication Data
US 2021/0127063 A1 Apr. 29, 2021

(30) Foreign Application Priority Data

Oct. 24, 2019 (JP) .............................. JP2019-193317

(51) Int. Cl.
*H04N 5/232* (2006.01)
*G06F 3/01* (2006.01)

(52) U.S. Cl.
CPC ......... *H04N 5/23245* (2013.01); *G06F 3/013* (2013.01); *H04N 5/23218* (2018.08); *H04N 5/23299* (2018.08); *H04N 5/232127* (2018.08); *H04N 5/232933* (2018.08)

(58) Field of Classification Search
CPC .......... H04N 5/23245; H04N 5/23299; H04N 5/23218; H04N 5/232127; H04N 5/232933; H04N 5/23219; H04N 5/232945; H04N 5/23216; H04N 5/23209; G06F 3/013

USPC ...................................................... 348/222.1
See application file for complete search history.

(56) References Cited

U.S. PATENT DOCUMENTS

| | | | |
|---|---|---|---|
| 9,445,005 B2* | 9/2016 | Seita | H04N 5/232122 |
| 10,459,190 B2* | 10/2019 | Suzuki | G06T 7/11 |
| 10,527,911 B2* | 1/2020 | Inai | H04N 5/23212 |
| 10,863,079 B2* | 12/2020 | Takehara | H04N 5/232127 |
| 2007/0018069 A1* | 1/2007 | Higashino | H04N 5/232945 250/200 |
| 2012/0013786 A1* | 1/2012 | Yasuda | H04N 5/232127 348/349 |
| 2013/0222301 A1* | 8/2013 | Lee | G06F 3/04883 345/173 |

(Continued)

FOREIGN PATENT DOCUMENTS

WO 2015/104884 A1 7/2015

*Primary Examiner* — Pritham D Prabhakher
(74) *Attorney, Agent, or Firm* — Cowan, Liebowitz & Latman, P.C.

(57) ABSTRACT

An electronic device comprising: at least one memory and at least one processor which function as: a receiving unit configured to receive a line of sight input given by a line of sight of a user; and a control unit configured to perform control such that, in a first state in which designation of a position of a position index based on the line of sight input is unavailable, the position index is displayed at a predetermined position on a display in response to a first operation having been performed, and in a second state in which the designation of the position of the position index based on the line of sight input is available, the position index is displayed at a position based on the line of sight input on the display in response to the first operation having been performed.

19 Claims, 8 Drawing Sheets

(56) References Cited

U.S. PATENT DOCUMENTS

| | | | |
|---|---|---|---|
| 2015/0022682 A1* | 1/2015 | Seita | H04N 5/23218 |
| | | | 348/220.1 |
| 2017/0366743 A1* | 12/2017 | Park | H04N 5/232127 |
| 2018/0220062 A1* | 8/2018 | Funatsu | H04N 5/23212 |
| 2018/0224723 A1* | 8/2018 | Inai | G03B 17/20 |
| 2018/0234631 A1* | 8/2018 | Takagi | H04N 5/232127 |
| 2018/0324351 A1* | 11/2018 | Yoshimoto | H04N 5/232939 |
| 2019/0020826 A1* | 1/2019 | Takehara | G06T 7/20 |
| 2019/0146584 A1* | 5/2019 | Onuki | G06F 3/015 |
| | | | 345/156 |

* cited by examiner

ELECTRONIC DEVICE THAT RECEIVES LINE OF SIGHT INPUT, METHOD OF CONTROLLING ELECTRONIC DEVICE, AND NON-TRANSITORY COMPUTER READABLE MEDIUM

BACKGROUND OF THE INVENTION

Field of the Invention

The present invention relates to an electronic device that receives a line of sight input, a method of controlling the electronic device, and a non-transitory computer readable medium.

Description of the Related Art

An electronic device which is operated by a user with his or her own line of sight (hereinafter, a line of sight input) is known. In particular, a line of sight input is effective when a user wants to immediately give an operation instruction to an electronic device such as a digital camera or a game machine.

On the other hand, due to characteristics of humans, a line of sight input is largely blurred. For this reason, in a case in which an electronic device is operated with a line of sight, a detected position of the line of sight (a viewed position) may not be directly used for an operation instruction to the electronic device. In such a case, by providing a means for determining a viewed position at a user's desired timing and a means for finely adjusting a final position thereof from the viewed position in accordance with the user's operation, an operation more suited to the user's intention can be realized with the line of sight input.

WO 2015/104884 describes a technique in which, when a user performs a predetermined operation, a pointer is caused to move to a viewed position, and a position of the pointer can be subsequently moved from the position of the movement destination in accordance with a direction-instructing operation.

In WO 2015/104884, for a certain period of time after a position of a pointer moves to a viewed position in response to a case in which a predetermined operation is performed, even if a direction-instructing operation is performed, the operation is disabled and the pointer remains at the position. This is because both of the predetermined operation and the direction-instructing operation are operations in accordance with a posture and acceleration of a sensing unit, and thus there is a possibility that an operation on the sensing unit after the predetermined operation is detected may be detected as a direction-instructing operation. In other words, this is for preventing the pointer from moving against the user's intention.

However, in the technique according to WO 2015/104884, there is room for studying suitable operability in consideration of both cases where a line of sight input is unavailable and available.

SUMMARY OF THE INVENTION

Therefore, it is an object of the present invention to further improve operability of an electronic device that can receive an operation performed by a line of sight input.

An aspect of the present invention is:
an electronic device comprising:
at least one memory and at least one processor which function as:
a receiving unit configured to receive a line of sight input given by a line of sight of a user; and
a control unit configured to perform control such that,
1) in a first state in which designation of a position of a position index based on the line of sight input is unavailable, the position index is displayed at a predetermined position on a display in response to a first operation having been performed, and
2) in a second state in which the designation of the position of the position index based on the line of sight input is available, the position index is displayed at a position based on the line of sight input on the display in response to the first operation having been performed.

Further features of the present invention will become apparent from the following description of exemplary embodiments with reference to the attached drawings.

DESCRIPTION OF THE EMBODIMENTS

In order to improve operability of an electronic device that receives an operation performed by a line of sight input, it is conceivable to provide a means for performing a movement operation (a jump operation) of a positional index to a viewed position in addition to the means for performing the direction-instructing operation described above. In this case, the following two problems may occur especially in a digital camera which is an example of the electronic device.

Problem 1

In a digital camera, an operation of returning a frame indicating a position for performing autofocus (AF) (hereinafter referred to as an AF frame) to a center of a screen that is an initial position is important, but in a case in which a line of sight input is available, there is a high possibility that a user desires to move the AF frame to a viewed position (a position pointed at by the line of sight). Therefore, since importance of the operation of returning it to the center decreases in the case in which the line of sight input is available, leaving the operation of returning the AF frame to the center as it is becomes a barrier in realizing various functions with a limited operation member of the digital camera.

Problem 2

When a means for jumping the AF frame to a viewed position and a means for finely adjusting the AF frame are located at positions which are physically separated from each other, movement of a finger occurs in a case of the user's operation, which makes it difficult to quickly perform the operation.

First Embodiment

External View of Digital Camera

Figure 1A:
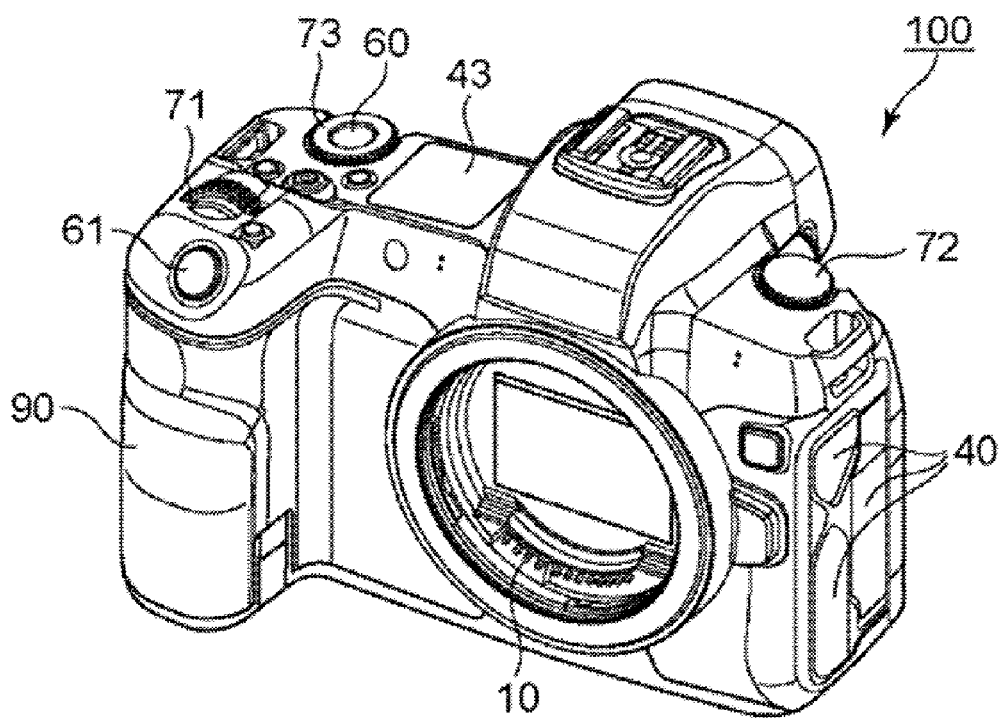
FIGS. 1A and 1B are external views of a digital camera according to a first embodiment.
Figure 1B:
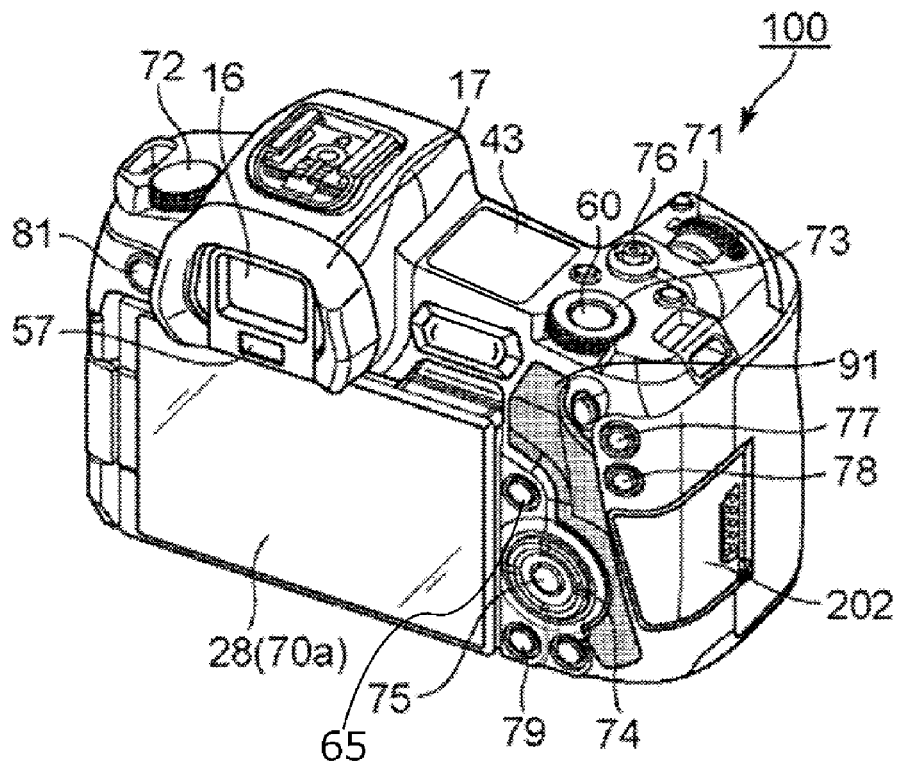

Hereinafter, preferred embodiments of the present invention will be described with reference to the figures. FIGS. 1A and 1B are external views of a digital camera 100 as an example of an apparatus to which the present invention can be applied. FIG. 1A is a front perspective view of the digital camera 100, and FIG. 1B is a back perspective view of the digital camera 100.

A display unit 28 is a display unit provided on a back surface of the camera, which displays images and various information. A touch panel 70a can detect a touch operation on a display surface (an operation surface) of the display unit 28. A finder outside display unit 43 is a display unit provided on an upper surface of the camera and displays various setting values of the camera such as a shutter speed and an aperture. A shutter button 61 is an operation unit for giving a shooting instruction. A mode switch 60 is an operation unit for switching between various modes. A terminal cover 40 is a cover that protects a connector (not shown) for connecting the digital camera 100 to a connection cable of external device.

A main electronic dial 71 is a rotary operation member, and the user can change the setting values such as the shutter speed and the aperture by turning the main electronic dial 71. A power switch 72 is an operation member for switching power of the digital camera 100 ON and OFF. A sub electronic dial 73 is a rotary operation member, with which movement of a selection frame, transmission of images, and the like can be performed.

A four-way key 74 is a four-way key operation member (a cross key) having a push button of which upper, lower, left, and right portions (four directions) can be pressed. The user can perform an operation corresponding to a direction pressed in the four-way key 74. A SET button 75 is a push button and is mainly used to determine a setting item or the like. A video button 76 is used for giving an instruction to start or stop video shooting (recording).

An exposure state can be fixed by pressing an AE lock button 77 in a shooting standby state. An enlargement button 78 is an operation button for switching an enlargement mode ON and OFF in a live view display of shooting mode. By operating the main electronic dial 71 after turning on the enlargement mode, a live view image can be enlarged or reduced. In a playback mode, the enlargement button 78 functions as an enlargement button for enlarging a playback image and increasing an enlargement ratio thereof.

A playback button 79 is an operation button for switching between the shooting mode and the playback mode. By pressing the playback button 79 during the shooting mode, the mode is changed to the playback mode, and a latest image among images recorded on a recording medium 200 can be displayed on the display unit 28. By pressing a menu button 81, a menu screen on which various settings can be set is displayed on the display unit 28. The user can intuitively perform various settings using the menu screen displayed on the display unit 28, the four-way key 74, the SET button 75, or a multi-controller (hereinafter, MC) 65.

The MC 65 is capable of receiving an operation of instructing a direction among eight directions (a direction-instructing operation), up, down, left, right, up-right, up-left, down-right, and down-left, and a pressing operation of a center button while the user's thumb (one finger) is always in contact with the MC 65. That is, the MC 65 is one operation member having the center button and an operation unit for the direction-instructing operation. A communication terminal 10 is a communication terminal for the digital camera 100 to communicate with a (detachable) lens unit 150, which will be described later.

An eyepiece unit 16 is an eyepiece unit of an eyepiece finder (a look-in type finder). The user can see a video displayed on an internal electric view finder (EVF) 29 via the eyepiece unit 16. An eyepiece sensing unit 57 is an eyepiece sensing sensor that senses whether or not the user brings his or her eye into contact with the eyepiece unit 16. A lid 202 is a lid of a slot for storing the recording medium 200. A grip part 90 is a holding part that is shaped such that the user can easily hold it with his or her right hand when holding the digital camera 100. The shutter button 61 and the main electronic dial 71 are disposed at positions at which they can be operated with the index finger of the right hand while the digital camera is held with the grip part 90 gripped by the little finger, the ring finger and the middle finger of the right hand. Further, in the same state, the sub electronic dial 73 is disposed at a position at which the sub electronic dial 73 can be operated with the thumb of the right hand. A thumb rest part 91 (a thumb standby position) is a grip member provided on the back surface side of the digital camera 100 at a location at which the thumb of the right hand holding the grip part 90 can be easily placed without operating any operation members. The thumb rest part 91 is formed of a rubber member or the like for increasing a holding force (a grip feeling).

Configuration of Digital Camera

Figure 2:
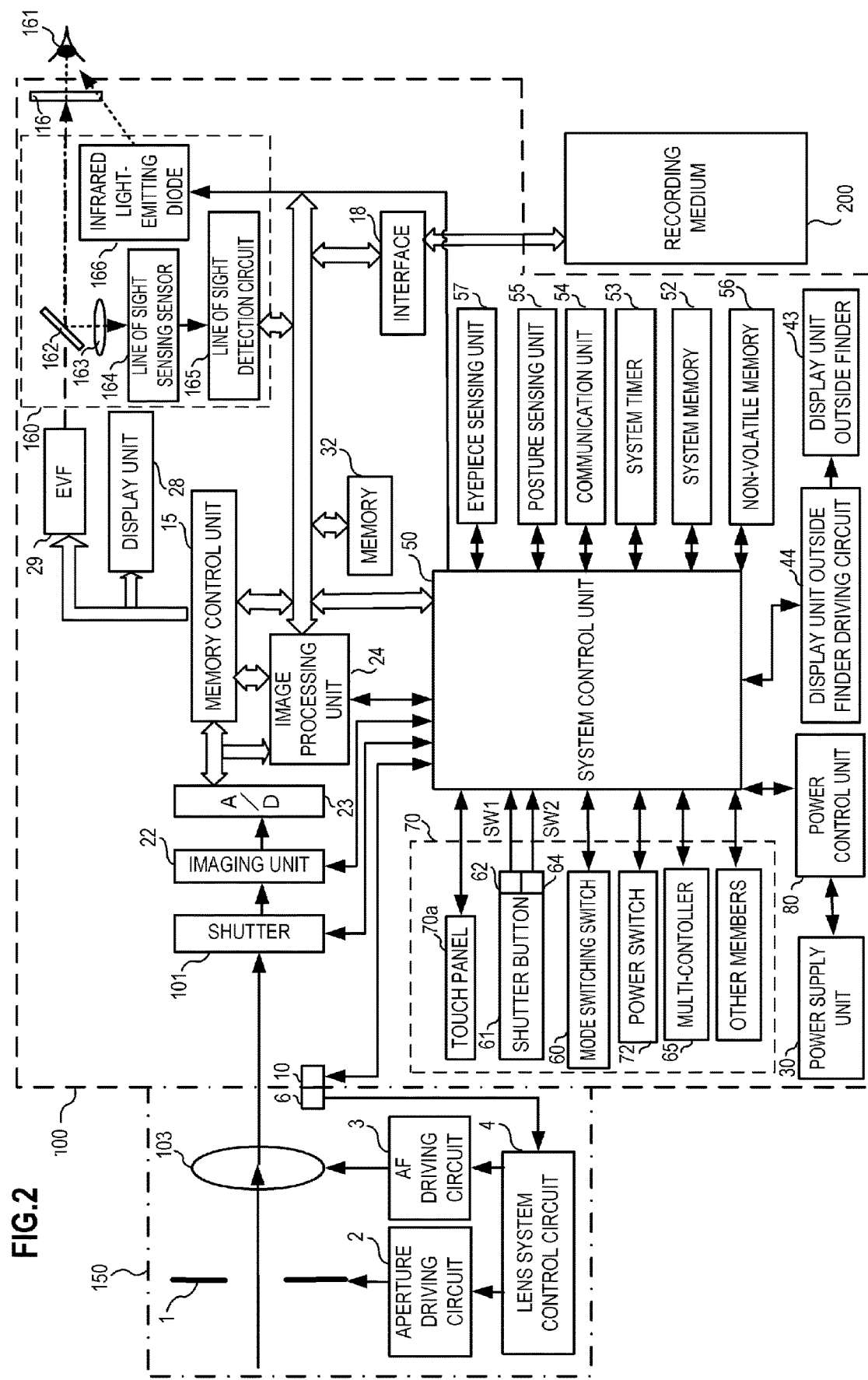
FIG. 2 is a configuration diagram of the digital camera according to the first embodiment.

FIG. 2 is a block diagram showing a configuration example of the digital camera 100 according to the present embodiment. The lens unit 150 is a lens unit on which an interchangeable shooting lens is mounted. A lens 103 is normally configured of a plurality of lenses, but FIG. 2 simply shows only one lens. A communication terminal 6 is a communication terminal for the lens unit 150 to perform communication with the digital camera 100. The lens unit 150 communicates with a system control unit 50 via the communication terminal 6 and the communication terminal 10 described above, and performs control of an aperture 1 via an aperture driving circuit 2 using an internal lens system control circuit 4. Then, the lens system control circuit 4 performs focusing by displacing the lens 103 via an AF driving circuit 3. A shutter 101 is a focal plane shutter that can freely control an exposure time of an image sensor 22 under control of the system control unit 50.

The image sensor 22 is an imaging element (an image sensor) configured of a charge coupled device (CCD) or a complementary metal oxide semiconductor (CMOS) element that converts an optical image into an electrical signal. An A/D converter 23 is used to convert an analog signal output from the image sensor 22 into a digital signal.

An image processing unit 24 performs predetermined pixel interpolation, resize processing such as reduction, color conversion processing, and the like on data from the A/D converter 23 or from a memory control unit 15, which will be described later. Also, the image processing unit 24 performs predetermined calculation processing using captured image data. The system control unit 50 performs exposure control and ranging control on the basis of the calculation results obtained by the image processing unit 24. Thus, through the lens (TTL) type autofocus (AF) processing, automatic exposure (AE) processing, and flash pre-emission (EF) processing are performed. The image processing unit 24 further performs predetermined calculation processing using the captured image data and performs TTL type auto white balance (AWB) processing on the basis of the obtained calculation results.

The memory control unit 15 controls data transmission and reception among the A/D converter 23, the image processing unit 24, and a memory 32. Output data from the A/D converter 23 is directly written to the memory 32 via the image processing unit 24 and the memory control unit 15, or via the memory control unit 15.

The memory 32 stores image data that is obtained by the image sensor 22 and then converted into digital data by the A/D converter 23 and image data to be displayed on the display unit 28 and the EVF 29. The memory 32 has a sufficient storage capacity for storing a predetermined number of still images and a predetermined amount of time of videos and audio. Further, the memory 32 also serves as an image display memory (a video memory). The display image data written in the memory 32 is displayed on the display unit 28 or the EVF 29 via the memory control unit 15.

Each of the display unit 28 and the EVF 29 performs display in accordance with a signal from the memory control unit 15 on a display such as an LCD or an organic EL. The live view display (LV display) can be performed by sequentially transferring the data that is A/D-converted by the A/D converter 23 and then stored in the memory 32 to the display unit 28 or the EVF 29 and displaying it. Hereinafter, an image displayed in the live view is referred to as a live view image (LV image).

An infrared light-emitting diode 166 is a light-emitting element for detecting a viewed position (position of a line of sight) of the user in a finder screen and irradiates an eyeball (eye) 161 of the user that has been brought into contact with the eyepiece unit 16 with infrared light. The infrared light emitted from the infrared light-emitting diode 166 is reflected by the eyeball (eye) 161, and the reflected infrared light reaches a dichroic mirror 162. The dichroic mirror 162 reflects only infrared light and transmits visible light. The infrared light of which an optical path has been changed forms an image on an imaging plane of a line of sight sensing sensor 164 via an image-forming lens 163. The image-forming lens 163 is an optical member that constitutes a line of sight detection optical system. The line of sight sensing sensor 164 is configured of an imaging device such as a CCD image sensor.

The line of sight sensing sensor 164 photoelectrically converts the reflected infrared light that is incident thereon into an electrical signal and outputs it to a line of sight detection circuit 165. The line of sight detection circuit 165 includes at least one processor and detects a viewed position of the user from an image or movement of the eyeball (eye) 161 of the user on the basis of an output signal of the line of sight sensing sensor 164 and outputs detection information to the system control unit 50. In this way, the dichroic mirror 162, the image-forming lens 163, the line of sight sensing sensor 164, the infrared light-emitting diode 166, and the line of sight detection circuit 165 constitute a line of sight detecting unit 160 (reception unit) that receives the line of sight input given by the line of sight of the user.

In the present embodiment, the digital camera 100 uses the line of sight detecting unit 160 to detect the line of sight using a method called a corneal reflection method. The corneal reflection method is a method of detecting a direction and a position of the line of sight from a positional relationship between reflected light formed by the infrared light emitted from the infrared light-emitting diode 166 being reflected on the eyeball (eye) 161 (particularly the cornea) and the pupil of the eyeball (eye) 161. In addition to this, there are various methods for detecting the direction and position of the line of sight, such as a method called a scleral reflection method that utilizes the fact that a reflectance of light differs between the iris and the sclera. Also, any other method may be used as long as it can detect the direction and position of the line of sight.

Various setting values of the camera such as the shutter speed and the aperture are displayed on the finder outside display unit 43 via a finder outside display driving circuit 44.

A non-volatile memory 56 is a memory that can be electrically erased and recorded on, and uses, for example, a flash-ROM or the like. The non-volatile memory 56 stores constants, programs, and the like for an operation of the system control unit 50. The programs referred to here are computer programs for executing various flowcharts, which will be described later in the present embodiment.

The system control unit 50 is a control unit including at least one processor or circuit and controls the entire digital camera 100. The system control unit 50 realizes each step of the processing of the present embodiment, which will be described later, by executing programs recorded in the non-volatile memory 56 described above. In a system memory 52, for example, a RAM is used, and constants and variables for the operation of the system control unit 50, programs read out from the non-volatile memory 56, and the like are developed. Also, the system control unit 50 performs display control by controlling the memory 32, the display unit 28, and the like. A system timer 53 is a time measuring unit that measures a time used for various controls and a time of an embedded clock.

The mode switch 60, a first shutter switch 62, a second shutter switch 64, and an operation unit 70 are operation means for inputting various operation instructions to the system control unit 50. The mode switch 60 switches an operation mode of the system control unit 50 to one of a still image shooting mode, a video shooting mode, and the like. Modes included in the still image shooting mode include an auto shooting mode, an auto scene determination mode, a manual mode, an aperture priority mode (Av mode), a shutter speed priority mode (Tv mode), and a program AE mode (P mode). In addition, there are various scene modes, custom modes, and the like, which are shooting settings for each shooting scene. The mode switch 60 allows the user to directly switch to any of these modes. Alternatively, after temporarily switching to a list screen of shooting modes with the mode switch 60, any of a plurality of displayed modes may be selected, and the mode may be switched thereto by using another operation member. Similarly, the video shooting mode may include a plurality of modes.

The first shutter switch 62 is turned on by so-called half-pressing (a shooting preparation instruction) during operation of the shutter button 61 provided on the digital camera 100 and generates a first shutter switch signal SW1. The system control unit 50 starts a shooting preparation operation such as autofocus (AF) processing, auto exposure (AE) processing, auto white balance (AWB) processing, or flash pre-emission (EF) processing in accordance with the first shutter switch signal SW1.

The second shutter switch 64 is turned on when the operation of the shutter button 61 is completed, that is, when the shutter button 61 is fully pressed (a shooting instruction), and generates a second shutter switch signal SW2. In accordance with the second shutter switch signal SW2, the system control unit 50 starts a series of shooting processing operations from reading out the signal from the image sensor 22 to writing captured images as image files on the recording medium 200.

The operation unit 70 is various operation members serving as an input unit that receives an operation from the user. The operation unit 70 includes at least the following operation units (operation members). That is, the operation unit 70 includes the shutter button 61, the multi-controller 65, the touch panel 70a, the main electronic dial 71, the power switch 72, and the sub electronic dial 73. The operation unit 70 includes the four-way key 74, the SET button 75, the video button 76, the AE lock button 77, the enlargement button 78, the playback button 79, and the menu button 81.

A power control unit 80 is configured of a battery detection circuit, a DC-DC converter, a switch circuit for switching a block to be energized, and the like, and detects whether or not a battery is mounted, a type of the battery, and a remaining battery level. Further, the power control unit 80 controls the DC-DC converter on the basis of the detection results and an instruction of the system control unit 50 and supplies a necessary voltage to each unit including the recording medium 200 for a necessary period. A power supply unit 30 is configured of a primary battery such as an alkaline battery or a lithium battery, a secondary battery such as a NiCd battery, a NiMH battery, or a Li battery, an AC adapter, and the like.

A recording medium interface 18 is an interface with the recording medium 200 such as a memory card or a hard disk. The recording medium 200 is a recording medium such as a memory card for recording captured images and is configured of a semiconductor memory, a magnetic disk, or the like.

A communication unit 54 is connected to external device and the like in a wireless manner or by a wired cable and performs transmission and reception of a video signal and an audio signal. The communication unit 54 can also be connected to a wireless local area network (LAN) or the Internet. Further, the communication unit 54 can also communicate with the external device using Bluetooth (registered trademark) or Bluetooth Low Energy. The communication unit 54 can transmit an image (including a live view image) captured by the image sensor 22 and an image recorded in the recording medium 200, and can receive images and various other information from the external device.

A posture sensing unit 55 senses a posture of the digital camera 100 with respect to a direction of gravity. On the basis of the posture sensed by the posture sensing unit 55, whether an image captured by the image sensor 22 is an image captured by holding the digital camera 100 horizontally or an image captured by holding the digital camera 100 vertically can be determined. The system control unit 50 can add orientation information corresponding to the posture sensed by the posture sensing unit 55 to an image file of the image captured by the image sensor 22, or record the image by rotating it. For the posture sensing unit 55, an acceleration sensor, a gyro sensor, or the like can be used. Further, the system control unit 50 can also sense movement (a pan, a tilt, a lift, whether stationary or not, etc.) of the digital camera 100 using the acceleration sensor or the gyro sensor in the posture sensing unit 55.

The eyepiece sensing unit 57 is an eyepiece sensing sensor that senses approach (eye proximity) of an eye (object) 161 to the eyepiece unit 16 of the finder and removal (eye separation) of the eye (object). The system control unit 50 switches between displaying (a displayed state) and hiding (a hidden state) of the display unit 28 and the EVF 29 in accordance with a state sensed by the eyepiece sensing unit 57. For example, in a case in which the digital camera 100 is in a shooting standby state and a switching setting of a display destination of the live view image is an automatic switching setting, when the eye is not in proximity, the system control unit 50 sets the display destination of the live view image to the display unit 28 and hides the EVF 29. In addition, when the eye is in proximity, the system control unit 50 sets the display destination of the live view image to the EVF 29 and hides the display unit 28. For the eyepiece sensing unit 57, for example, an infrared proximity sensor can be used, and it is possible to sense approach of any object to the eyepiece unit 16 of the finder incorporating the EVF 29. In a case in which an object approaches, infrared light emitted from a light projection unit (not shown) of the eyepiece sensing unit 57 is reflected by the object and received by a light receiving unit (not shown) of the infrared proximity sensor. On the basis of an amount of the received infrared light, eyepiece sensing unit 57 can also determine how far the object is from the eyepiece unit 16 (an eye proximity distance). As described above, the eyepiece sensing unit 57 performs eye proximity sensing of sensing an approaching distance of the object to the eyepiece unit 16.

In addition, in a case in which an object approaching the eyepiece unit 16 within a predetermined distance is detected after a state in which the eye is not in proximity (a non-approaching state), the eyepiece sensing unit 57 detects that the object is in a state in which the eye is in proximity. In a case in which the object whose approach has been sensed becomes separated therefrom after the state in which the eye is in proximity (approaching state) by at least a predetermined distance, the eyepiece sensing unit 57 detects that the object is in a state in which the eye is separated therefrom. A threshold for detecting the eye proximity and a threshold for detecting the eye separation may be different from each other, for example, by providing hysteresis. Further, after detection of the eye proximity, the state in which the eye is in proximity is assumed until the eye separation is detected. After detection of the eye separation, the state in which the eye is not in proximity is assumed until the eye proximity is detected. Also, the infrared proximity sensor is an example, and the eyepiece sensing unit 57 may use another sensor as long as it can sense approaching of an eye or an object for which eye proximity can be considered. In addition, in the present embodiment, the light projection unit and the light receiving unit of the eyepiece sensing unit 57 are assumed to be devices separate from the infrared light-emitting diode 166 and the line of sight sensing sensor 164. However, the infrared light-emitting diode 166 may also serve as the light projection unit of the eyepiece sensing unit 57. Further, the line of sight sensing sensor 164 may also serve as the light receiving unit.

The system control unit 50 can sense the following operations or states on the basis of an output from the line of sight detecting unit 160.

A line of sight of a user whose eye is in proximity to the eyepiece unit 16 is newly input (detected). That is, start of a line of sight input.

A state in which there is a line of sight input of the user whose eye is in proximity to the eyepiece unit 16.

A state in which the user whose eye is in proximity to the eyepiece unit 16 is gazing at.

The user whose eye is in proximity to the eyepiece unit 16 has removed the line of sight that was being input. That is, end of the line of sight input.

A state in which the user whose eye is in proximity to the eyepiece unit 16 is not inputting any line of sight.

Further, the term "gazing" refers to a case in which movement of a viewed position of the user does not exceed a predetermined amount within a predetermined time. That is, the system control unit 50 determines, on the basis of detection information received from the line of sight detection circuit 165, that a region is being gazed at when a period in which the line of sight of the user is fixed in a certain region has exceeded a predetermined threshold. Therefore, it can be said that the region is a position of gaze (a region of gaze) that is a position at which gazing is performed. Also, the expression "line of sight is fixed in a certain region" means that, for example, an average position of the movement of the line of sight is within the region until a predetermined period elapses and a variation (dispersion) thereof is smaller than a predetermined value.

The touch panel 70a and the display unit 28 can be integrally formed. For example, the touch panel 70a is configured such that a light transmittance thereof does not hinder the display on the display unit 28 and is attached to an upper layer of the display surface of the display unit 28. In addition, input coordinates on the touch panel 70a are associated with display coordinates on the display screen of the display unit 28. Thus, it is possible to provide a graphical user interface (GUI) through which the user can directly operate a screen displayed on the display unit 28.

The system control unit 50 can detect the following operations or states on the touch panel 70a.

A finger or pen that has not touched the touch panel 70a newly touches the touch panel 70a. That is, start of a touch (hereinafter referred to as a touch-down).

A state in which the touch panel 70a is being touched with a finger or a pen (hereinafter referred to as a touch-on).

A finger or a pen is moving while touching the touch panel 70a (hereinafter referred to as a touch-move).

A finger or pen that was touching the touch panel 70a has been removed from the touch panel 70a. That is, end of the touch (hereinafter referred to as a touch-up).

A state in which nothing is touching the touch panel 70a (hereinafter referred to as a touch-off).

When the touch-down is detected by the system control unit 50, the touch-on is also detected at the same time. After the touch-down, the touch-on is normally continuously detected unless the touch-up is detected. When the touch-move is being detected, the touch-on is also being detected at the same time. Even when the touch-on is being detected, the touch-move is not detected unless a touch position is being moved. After touch-up of all the touching fingers or pens is detected, the touch-off is detected.

The system control unit 50 is notified by the touch panel 70a of these operations and states and position coordinates in which the finger or the pen is touching the touch panel 70a via an internal bus. The system control unit 50 determines what operation (touch operation) has been performed on the touch panel 70a on the basis of the information of which it is notified. For the touch-move, a moving direction of the finger or the pen moving on the touch panel 70a can also be determined for each of a vertical component and a horizontal component on the touch panel 70a on the basis of changes in the position coordinates. In a case in which it is detected that the touch-move has been performed for at least a predetermined distance, the system control unit 50 determines that a sliding operation has been performed.

An operation of quickly moving a finger a certain distance while touching the touch panel 70a and then releasing it is called a flick. In other words, the flick is an operation of quickly tracing the touch panel 70a as if flicking it with the finger. When it is detected that a touch-move has been performed at least for a predetermined distance at least at a predetermined speed and then the touch-up is detected, it can be determined that the flick has been performed (it can be determined that there has been the flick following the sliding operation).

Further, a touch operation of touching a plurality of positions (for example, two points) (multi-touching) at the same time and bringing the touch positions closer to each other is referred to as a pinch-in, and a touch operation for moving the touch positions away from each other is referred to as a pinch-out. The pinch-out and pinch-in are collectively referred to as a pinch operation (or simply a pinch).

The touch panel 70a may be any of various types of touch panels such as a resistive film type, a capacitive type, a surface acoustic wave type, an infrared type, an electromagnetic induction type, an image recognition type, and an optical sensor type. There are a method of detecting that a touch has been performed when there is a touch on the touch panel, and a method of detecting that a touch has been performed when there is a finger or a pen approaching the touch panel, and either method may be used.

When a touch-move operation is performed in the eye proximity state, the user can set a method of designating a position of a position index in response to the touch-move operation to either an absolute position designation or a relative position designation. For example, assuming that the position index is an AF frame, in the case of the absolute position designation, when the touch panel 70a is touched, an AF position associated with the touched position (the position of which coordinates have been input) is set regardless of the AF position (current AF position) that was set before the touch. That is, the position coordinates at which the touch operation is performed and the position coordinates on the display unit 28 are associated with each other. On the other hand, in the case of the relative position designation, the position coordinates at which the touch operation is performed and the position coordinates on the display unit 28 are not associated with each other. In the relative position designation, the AF position is moved in a moving direction of the touch-move from the AF position (current AF position) that was set before the touch for a distance corresponding to a movement amount of the touch-move regardless of a touch-down position on the touch panel 70a.

Regarding Settings Related to Shooting

First, in the following, settings related to shooting according to the present embodiment will be described using screens shown in FIGS. 3A to 3C.

Figure 3A:
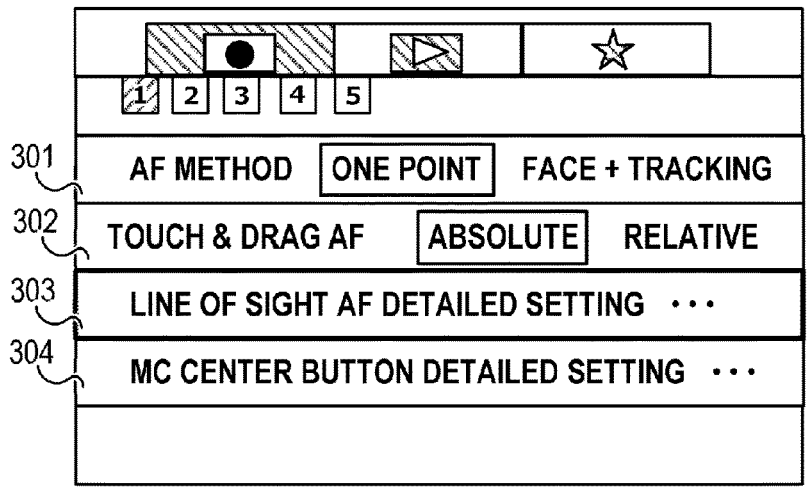
FIGS. 3A to 3C are diagrams showing screens for shooting settings according to the first embodiment.

FIG. 3A shows a setting menu screen related to shooting displayed on the EVF 29 or the display unit 28. Setting items 301 to 304 are displayed on the menu screen. In the present embodiment, by using the screen in FIG. 3A, it is possible to perform an AF method setting, a touch & drag AF setting, a line of sight function related setting, and a setting related to the center button of the MC 65.

A setting item 301 indicates the AF method setting. The AF method setting includes "one point AF" which is for setting a position designated by the user to the AF position, and "face+tracking priority AF" which is a mode for detecting a subject (object) that is an object of shooting in a live view image, and in which the subject can be tracked and located at the AF position.

A setting item 302 indicates the touch & drag AF setting. In the present embodiment, the touch & drag AF setting is a setting as to which of the above-described absolute position designation and relative position designation is used when the position index is moved using touch & drag.

The setting item 303 indicates the line of sight function related setting. When the setting item 303 is selected, the screen changes to the screen shown in FIG. 3B. The setting item 304 indicates the setting related to the center button of the MC 65. That is, the setting item 304 indicates a setting of what function is assigned to the center button. When the setting item 304 is selected, the screen changes to the screen shown in FIG. 3C.

Figure 3B:
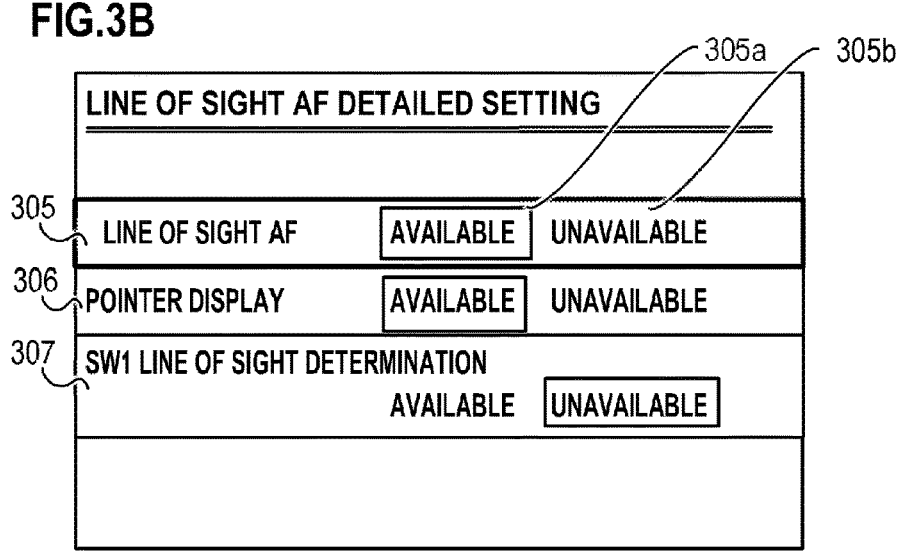

In the screen shown in FIG. 3B, the EVF 29 or the display unit 28 displays setting items 305 to 307. The setting item 305 indicates a setting for availability or unavailability of a line of sight function that receives the line of sight input (a line of sight AF setting). The setting item 306 indicates a setting of whether or not to display a pointer on the basis of the viewed position (a pointer display setting). The setting item 307 indicates availability or unavailability of a function (viewed position determination function) of moving (jumping) the AF frame on the basis of a detected viewed position when SW1 is pressed. For example, when an option 305*a* in the setting item 305 is selected, the line of sight function becomes available, and thus the position of the position index (AF frame) can be designated by a line of sight input. On the other hand, when an option 305*b* is selected, the line of sight function becomes unavailable, and thus the position of the position index (AF frame) cannot be designated by a line of sight input.

Figure 3C:
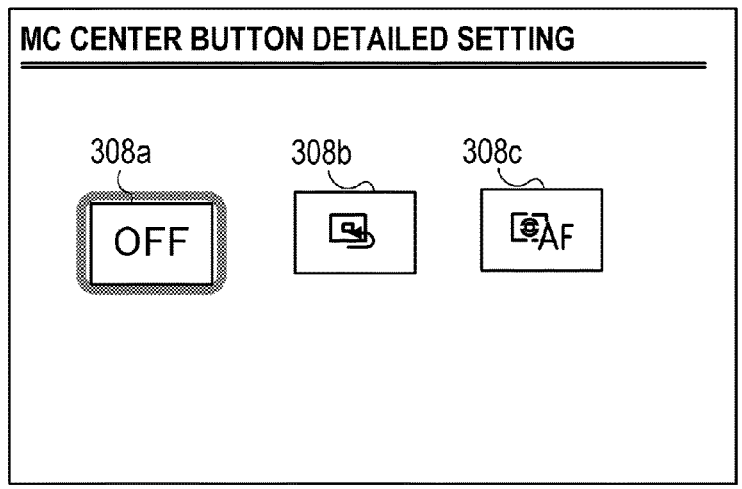

In the screen shown in FIG. 3C, the EVF 29 or the display unit 28 displays setting candidates 308*a* to 308*c*. The setting candidate 308*a* is an option for setting (unavailable setting) that no special function is executed even if the center button of the MC 65 is pressed. The setting candidate 308*b* is an option for setting on the center button a function of returning (moving) the position of the AF frame to the center on the screen. The setting candidate 308*c* is an option for setting a function of executing AF on the center button. In the example shown in FIG. 3C, since a cursor surrounded by a thick frame indicates the setting candidate 308*a*, a setting for disabling the function of the center button has been done.

Regarding Shooting Processing

Figure 4:
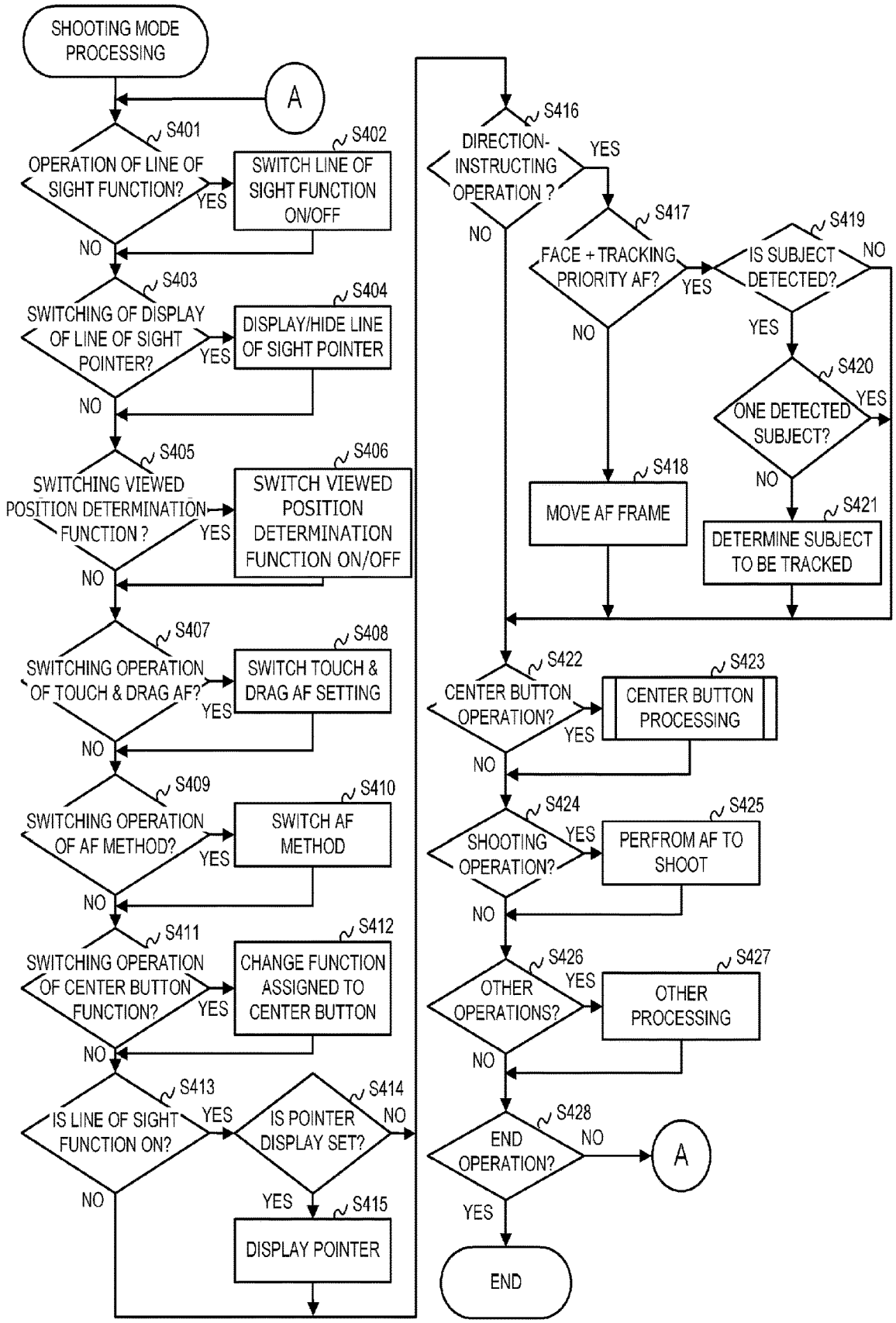
FIG. 4 is a flowchart showing shooting processing according to the first embodiment.

Shooting mode processing of the digital camera 100 according to the present embodiment will be described below with reference to the flowchart shown in FIG. 4. In this flowchart, the digital camera 100 changes a position to which the AF frame is moved (displayed) when a predetermined operation is performed in a state in which the position of the AF frame that is the position index can be designated by the line of sight input and in a state in which the position of the AF frame cannot be designated by the line of sight input. This can improve operability for the user.

Before the processing of this flowchart is started, first, when the power switch 72 is operated to switch power on, the system control unit 50 initializes flags and control variables, and then shooting a live view image in the image sensor 22 is started and the live view image is displayed on the display unit 28. Further, on the basis of camera setting values, the system control unit 50 superimposes and displays information icons indicating the camera setting values on the live view image. Then, the processing of FIG. 4 starts. Also, the processing of the flowchart is realized by developing a program stored in the non-volatile memory 56 into the system memory 52 and executing it using the system control unit 50.

In S401, the system control unit 50 determines whether or not an operation of switching the line of sight function to be available or unavailable (an operation of changing the setting of the setting item 305) on the operation unit 70 has been performed. If the operation is performed, the process proceeds to S402, and if not, the process proceeds to S403. In S402, the system control unit 50 switches the line of sight function to be available or unavailable. The system control unit 50 records the setting contents of the switching results in the non-volatile memory 56.

In S403, the system control unit 50 determines whether or not an operation of switching a line of sight pointer display indicating a destination of the line of sight of the user to be available or unavailable (an operation of changing the setting of the setting item 306) on the operation unit 70 has been performed. If the operation is performed, the process proceeds to S404, and if not, the process proceeds to S405. In S404, the system control unit 50 switches the line of sight pointer display to be available or unavailable. The system control unit 50 records the setting contents of the switching results in the non-volatile memory 56.

In S405, the system control unit 50 determines whether or not an operation of switching the viewed position determination function to be available or unavailable (an operation of changing the setting of the setting item 307) has been performed. The viewed position determination function is a function of determination the viewed position in response to pressing of the first shutter switch 62. If the operation is performed, the process proceeds to S406, and if not, the process proceeds to S407. In S406, the system control unit 50 switches the viewed position determination function to be available or unavailable. The system control unit 50 records the setting contents of the switching results in the non-volatile memory 56.

In S407, the system control unit 50 determines whether or not an operation of switching the touch & drag AF setting (an operation of changing the setting of the setting item 302) has been performed. If the operation is performed, the process proceeds to S408, and if not, the process proceeds to S409. In S408, the system control unit 50 switches the touch & drag AF setting. The system control unit 50 records the setting contents of the switching results in the non-volatile memory 56.

In S409, the system control unit 50 determines whether or not an operation of switching the AF method setting (an operation of changing the setting of the setting item 301) has been performed. If the operation is performed, the process proceeds to S410, and if not, the process proceeds to S411. In S410, the system control unit 50 switches the AF method setting. The system control unit 50 records the setting contents of the switching results in the non-volatile memory 56.

In S411, the system control unit 50 determines whether or not an operation of switching the function of the center button of the MC 65 (an operation of changing the setting of the setting item 304) has been performed. If the operation is performed, the process proceeds to S412, and if not, the process proceeds to S413. In S412, the system control unit 50 switches the function of the center button of the MC 65. The system control unit 50 records the setting contents (information corresponding to any of the setting candidates 308*a* to 308*c*) of the switching results in the non-volatile memory 56.

In S413, the system control unit 50 refers to the non-volatile memory 56 and determines whether or not the line of sight function is available. If the line of sight function is available, the process proceeds to S414, and if not, the process proceeds to S416.

In S414, the system control unit 50 refers to the non-volatile memory 56 and determines whether or not the line of sight pointer display is available. If the line of sight pointer display is available, the process proceeds to S415, and if not, the process proceeds to S416.

Figure 5A:
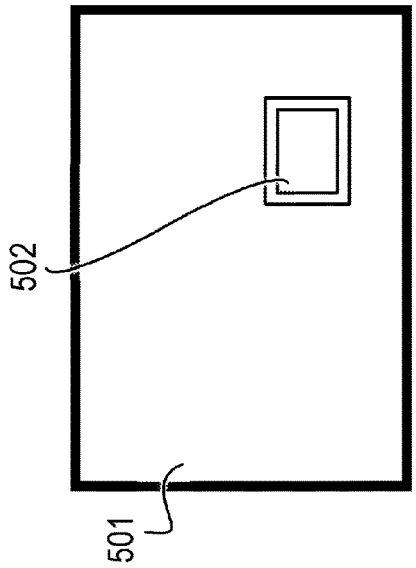
FIGS. 5A to 5O are diagrams showing screens of the digital camera according to the first embodiment.
Figure 5B:
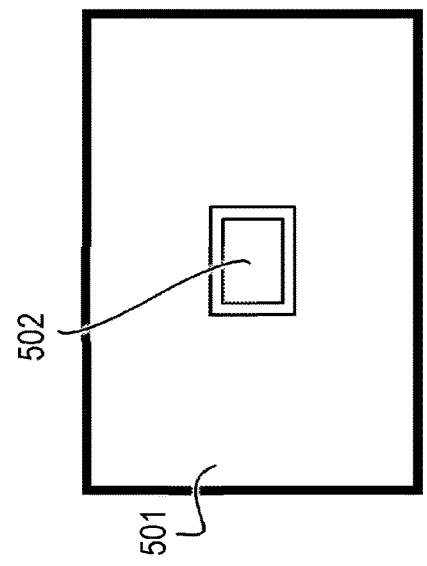
Figure 5E:
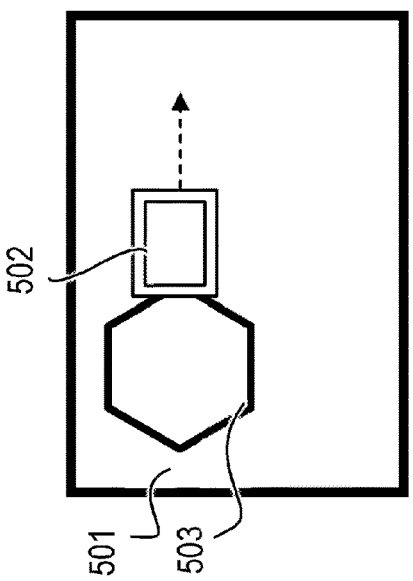
Figure 5D:
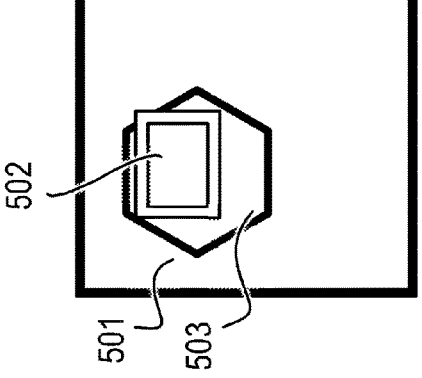
Figure 5C:
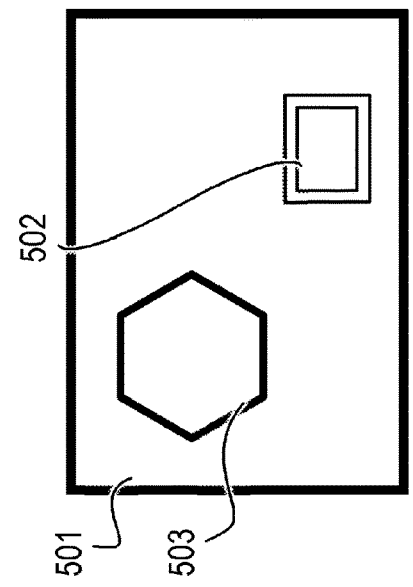

In S415, the system control unit 50 displays the line of sight pointer on the EVF 29. Further, the line of sight pointer is displayed when the line of sight detecting unit 160 detects the line of sight input. Therefore, in a case in which the user is not in eye proximity to the eyepiece unit 16 and the display destination is the display unit 28, the line of sight pointer is not displayed. FIG. 5C is an example of a screen in which the line of sight pointer display is performed on the EVF 29. A one point AF frame 502 and a line of sight pointer 503 that is at a position based on the line of sight input are displayed to be superimposed on the live view image 501. A display position of the line of sight pointer 503 moves to follow a viewed position (position of the line of sight input) detected by the line of sight detecting unit 160. The reason why the user views the live view image is not limited to the case in which the user wants to designate the AF position. For this reason, although the line of sight pointer 503 moves to follow the viewed position, execution of AF at the position of the line of sight pointer 503 or update of a tracking target is not performed until an operation of determining the viewed position is performed.

In S416, the system control unit 50 determines whether or not a direction-instructing operation has been performed on the MC 65. If the direction-instructing operation is performed, the process proceeds to S417, and if not, the process proceeds to S422.

In S417, the system control unit 50 refers to the non-volatile memory 56 and determines whether or not the AF method is "face+tracking priority AF". If the AF method is "face+tracking priority AF", the process proceeds to S419, and if not, the process proceeds to S418.

In S418, the system control unit 50 moves the one point AF frame 502 in accordance with the direction-instructing operation on the MC 65. The movement of the AF frame 502 in accordance with the direction-instructing operation on the MC 65 is a movement that does not depend on the viewed position (when the line of sight pointer 503 is displayed, its display position) while the direction-instructing operation on the MC 65 is performed even when the line of sight input is available. FIGS. 5A and 5B are screen examples of the EVF 29 or the display unit 28 when the system control unit 50 moves the one point AF frame 502. From a state in which the one point AF frame 502 is displayed at a center of a screen as shown in FIG. 5A, for example, if instruction operations in a downwardly rightward direction are performed on the MC65 several times, the one point AF frame 502 moves in the downwardly rightward direction of the screen as shown in FIG. 5B.

In S419, the system control unit 50 determines whether or not a specific type of subject (a person's face, a person's eye, an animal, a vehicle, a building, etc.) is detected from the live view image captured by the image sensor 22. If the specific type of subject is detected, the process proceeds to S420, and if not, the process proceeds to S422. The detection of the specific type of subject can be realized by the system control unit 50 interpreting (analyzing) the live view image captured by the image sensor 22 (subject recognition processing).

In S420, the system control unit 50 determines whether or not there is one detected subject. If the number of detected subjects is one, the process proceeds to S422, and if not, the process proceeds to S421.

Figure 5F:
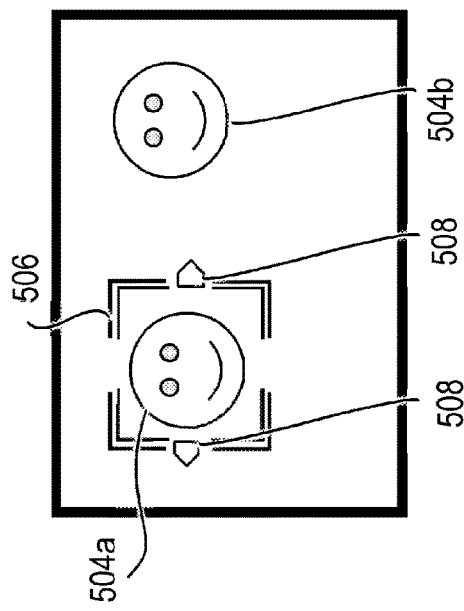
Figure 5G:
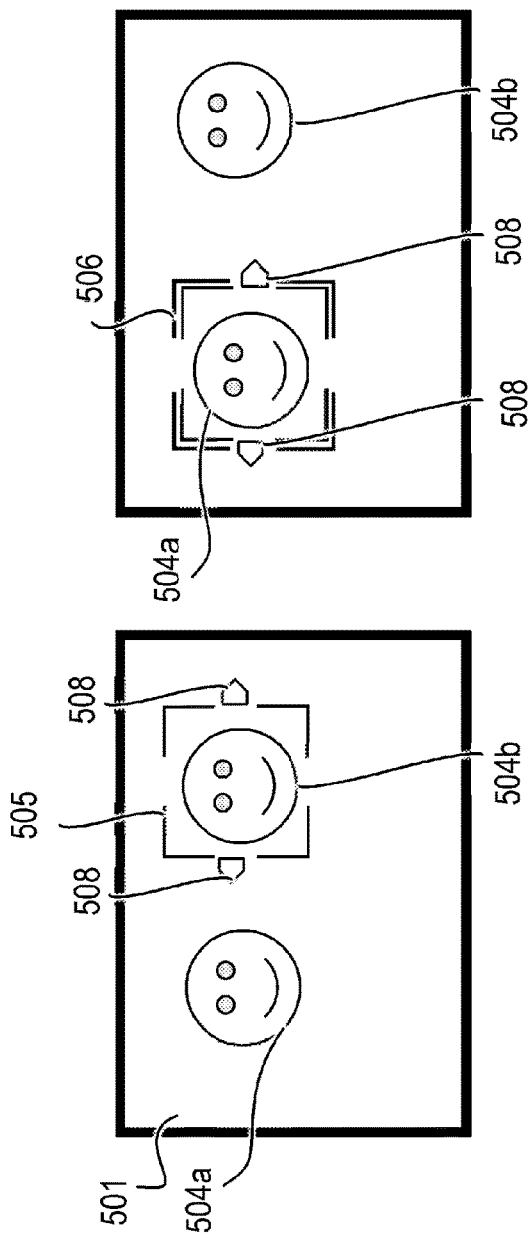

In S421, the system control unit 50 determines (changes) the subject to be tracked. FIGS. 5F and 5G are screen examples of the EVF 29 or the display unit 28 when determining (switching) the subject to be tracked. In FIG. 5F, a face detection frame 505 and left and right icons 508 are displayed to be superimposed on the live view image 501 including subjects 504a and 504b. In this case, the face detection frame 505 and the left and right icons 508 are superimposed on the subject 504b, and are set to track the subject 504b. The left and right icons 508 indicate that the subject to be tracked (selected) can be switched by the MC 65 or the four-way key 74. From the state of FIG. 5F, when an instruction operation in a leftward direction is performed on the MC65, the tracking target switches to the subject 504a, and as shown in FIG. 5G, a tracking frame 506 and the left and right icons 508 are displayed (superimposed) on the subject 504a.

In S422, the system control unit 50 determines whether or not the center button of the MC 65 has been pressed. If the center button is pressed, the process proceeds to S423, and if not, the process proceeds to S424.

In S423, the system control unit 50 executes processing (center button processing) in response to the pressing of the center button of the MC 65. Also, the center button processing will be described later in detail with reference to the flowchart shown in FIG. 6.

In S424, the system control unit 50 determines whether or not a shooting operation (half-pressing and full-pressing of the shutter button 61) has been performed on the operation unit 70. If the operation is performed, the process proceeds to S425, and if not, the process proceeds to S426.

In S425, the system control unit 50 performs AF at the current position of the one point AF frame or the position of the tracking frame to perform shooting (not shooting of a live view image, but a series of processing steps until a main exposure is performed and images are recorded as image files on the recording medium 200). Therefore, in the present embodiment, it can be said that the tracking frame is the AF frame.

In S426, the system control unit 50 determines whether or not another operation has been performed on the operation unit 70. If the operation is performed, the processing proceeds to S427, and if not, the processing proceeds to S428.

In S427, the system control unit 50 performs processing in response to the operation performed in S426. This processing includes, for example, video shooting in response to a start operation for video recording, an operation of moving an AE position, and the like.

In S428, the system control unit 50 determines whether or not an end operation has been performed on the operation unit 70. If the end operation is performed, the process of the flowchart ends, and if not, the process proceeds to S401.

Regarding Central Button Processing; S423

Figure 6:
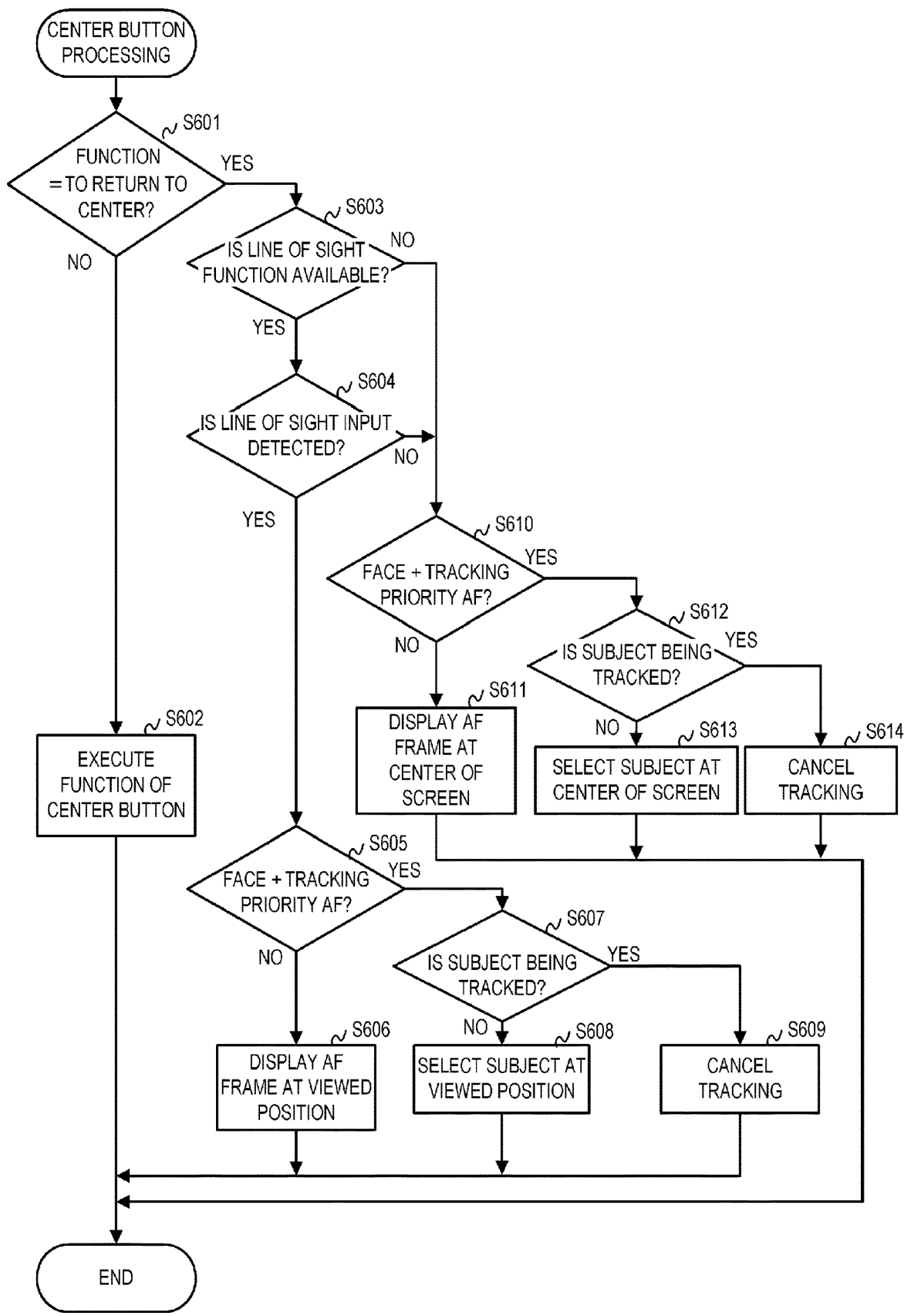
FIG. 6 is a flowchart showing central button processing according to the first embodiment.

In the following, the processing in S423 in a case in which the center button of the MC65 is pressed will be described with reference to the flowchart shown in FIG. 6. The processing of the flowchart is realized by developing a program stored in the non-volatile memory 56 into the system memory 52 and executing it using the system control unit 50.

In S601, the system control unit 50 determines whether or not a function assigned to the center button of the MC 65 is a "function of returning the AF frame to the center of the screen" (the setting candidate 308b). If the function assigned to the center button is the "function of returning the AF frame to the center of the screen", the process proceeds to S603, and if not, the process proceeds to S602.

In S602, the system control unit 50 executes the function assigned to the center button of the MC 65. For example, if the assigned function is "execution of AF" (the setting candidate 308c), the system control unit 50 executes AF on the basis of the current AF method and the position of the AF frame (one point AF frame or tracking frame).

In S603, the system control unit 50 determines whether or not the line of sight function is available. If the line of sight function is available, the process proceeds to S604, and if not, the process proceeds to S610.

In S604, the system control unit 50 determines whether or not the line of sight input has been detected. If the line of sight input is detected, the process proceeds to S605, and if not, the process proceeds to S610.

In S605, the system control unit 50 determines whether or not the AF method is "face+tracking priority AF". If the AF method is "face+tracking priority AF", the processing proceeds to S607, and if not, the processing proceeds to S606.

In S606, the system control unit 50 displays (moves) the one point AF frame 502 at the position of the line of sight pointer 503 (the position at which the line of sight is detected). FIGS. 5C and 5D are examples of screens on the EVF 29 when the one point AF frame 502 is moved to the viewed position. In FIGS. 5C and 5D, the one point AF frame 502 and the line of sight pointer 503 are displayed to be superimposed on the live view image 501. Here, in FIG. 5C, the one point AF frame 502 and the line of sight pointer 503 are displayed at positions apart from each other. In this case, by pressing the center button of the MC65 in a state in which the line of sight function is available and the line of sight input is detected, as shown in FIG. 5D, the one point AF frame 502 moves to the position of the line of sight pointer 503. Further, after that, when a direction-instructing operation is performed on the MC 65, as shown in FIG. 5E, the one point AF frame 502 can be finely adjusted from the viewed position (S416 to S418). The movement of the AF frame 502 in response to the direction-instructing operation on the MC 65 is a movement that does not depend on the viewed position (when the line of sight pointer 503 is displayed, its display position) while the direction-instructing operation on the MC 65 is performed even when the line of sight input is available.

In S607, the system control unit 50 determines whether or not the detected subject is being tracked. If the subject is being tracked, the process proceeds to S609, and if not, the process proceeds to S608. In S608, the system control unit 50 selects the subject at the viewed position and starts tracking of the subject. In S609, the system control unit 50 cancels tracking (a tracking state) for the subject. Here, when the tracking of the subject is canceled, the system control unit 50 hides the tracking frame.

Figure 5H:
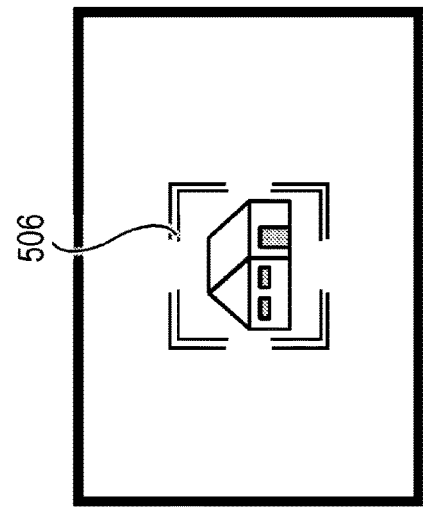
Figure 5I:
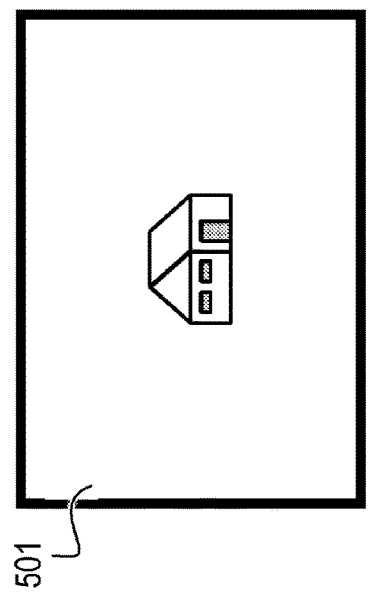
Figure 5J:
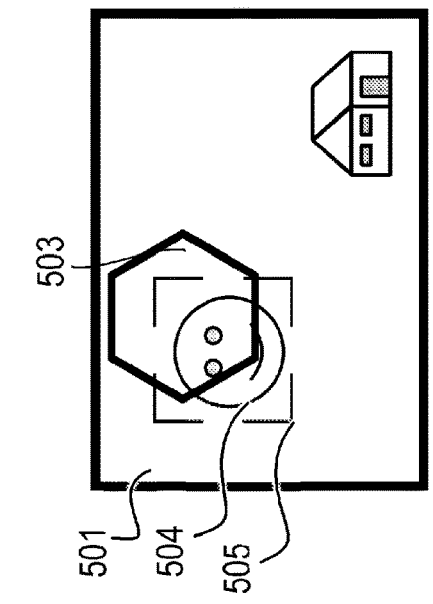
Figure 5K:
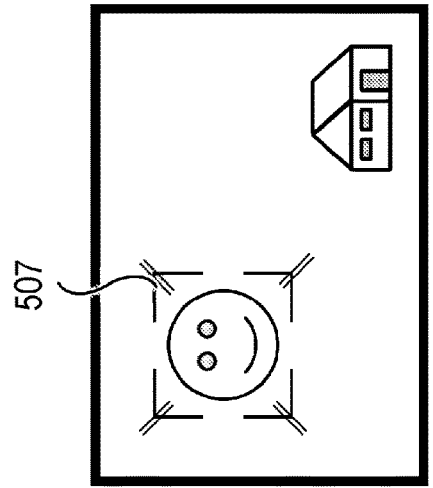

FIGS. 5J to 5O are examples of screens in the EVF 29 for tracking a subject using the line of sight when the AF method is "face+tracking priority AF". In FIG. 5J, the line of sight pointer 503 and the face detection frame 505 are displayed to be superimposed on the live view image 501 including the subject 504. Here, the line of sight pointer 503 moves in accordance with the viewed position. However, when the line of sight pointer 503 approaches the face detection frame 505, two types of display objects are covered and visibility is poor. For this reason, in this case, the system control unit 50 may hide the line of sight pointer 503 as shown in FIG. 5K and change the face detection frame 505 to a face detection frame 507 expressing adsorption. Further, in this case, the system control unit 50 may simply hide the line of sight pointer 503 and display the face detection frame 505.

Figure 5L:
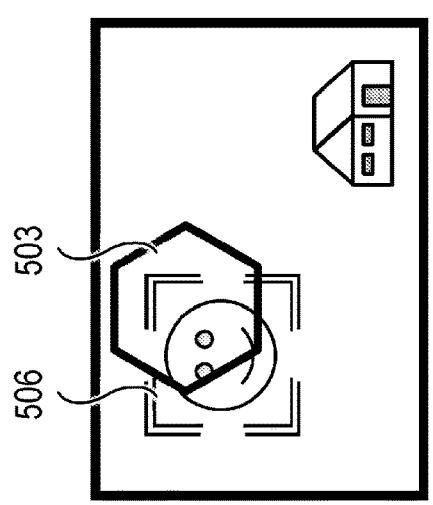
Figure 5M:
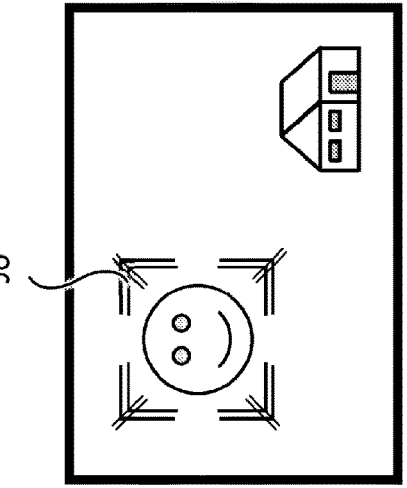

When the center button of the MC65 is pressed in the state shown in FIG. 5K, the system control unit 50 displays the tracking frame 506 on the subject at the position of the line of sight pointer 503 as shown in FIG. 5L and starts tracking of the subject. Also, in this case, if the subject does not present at the position of the line of sight pointer 503, the system control unit 50 does not display the tracking frame 506 and does not track the subject, but the one point AF frame 502 may be displayed at the position of the line of sight pointer 503. Further, even in a case in which the tracking frame 506 is displayed at the position of the line of sight pointer 503, since two types of display objects are covered and visibility is poor, the line of sight pointer 503 may be hidden as shown in FIG. 5M, and the tracking frame 506 may be changed to the tracking frame 508 expressing adsorption. Also, in this case, the system control unit 50 may simply hide the line of sight pointer 503 and display the tracking frame 506.

Figure 5N:
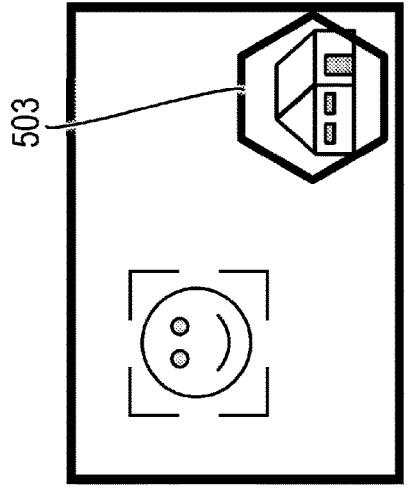
Figure 5O:
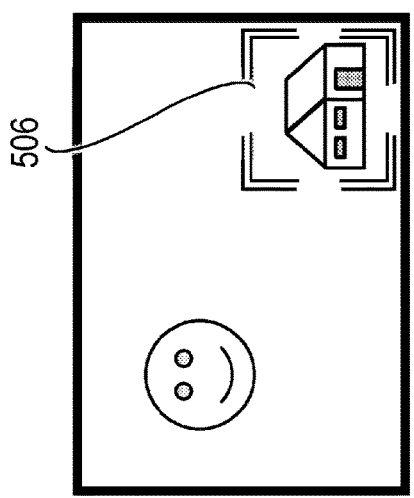

Further, as shown in FIG. 5N, when the center button of the MC 65 is pressed while the line of sight pointer 503 indicates a subject of a house, the system control unit 50 displays the tracking frame 506 for the subject of the house as shown in FIG. 5O and starts tracking of the subject of the house.

Further, in a case in which the tracking of the subject (tracking state) is canceled in S609, for example, the display state of FIG. 5O is changed to the display state of FIG. 5J, FIG. 5K, or FIG. 5N (in a case in which the line of sight pointer is displayed). Also, for example, the display state of FIG. 5I is changed to the display state of FIG. 5H (in a case in which the line of sight pointer is not displayed).

In S610, the system control unit 50 determines whether or not the AF method is "face+tracking priority AF". If the AF method is "face+tracking priority AF", the process proceeds to S612, and if not, the process proceeds to S611.

In S611, since the function assigned to the center button of the MC65 is the "function of returning the AF frame to the center of the screen", the system control unit 50 displays (moves) the one point AF frame 502 at the center of the screen (in the middle of the screen) of the EVF 29 or the display unit 28. Thus, for example, when the center button of the MC 65 is pressed in the display state as shown in FIG. 5B, the display is updated in response thereto as shown in FIG. 5A, and the one point AF frame 502 moves to the center of the screen. As a result, the AF position can be reset to the center faster than performing the direction-instructing operation on the MC 65. Also, the reset to the center of the screen is movement to a position (center) that does not depend on the viewed position (line of sight input position).

In S612, the system control unit 50 determines whether or not the detected subject is being tracked. If the tracking is in progress, the process proceeds to S614, and if not, the process proceeds to S613. In S613, the system control unit 50 selects a subject in the center of the screen of the EVF 29 or the display unit 28 and starts tracking of the subject. In S614, the system control unit 50 cancels tracking (tracking state) of the subject.

FIGS. 5H and 5I are examples of screens for tracking a subject when the line of sight is not used. In FIG. 5H, the live view image 501 is displayed and the subject is not being tracked. In S613, if the center button of the MC65 is pressed from the above state, the system control unit 50 displays the tracking frame 506 on the subject at the center of the screen as shown in FIG. 5I and starts tracking of the subject. Also, if there is no trackable subject in the center of the screen when the center button of the MC65 is pressed, the tracking frame 506 is not displayed and the subject is not tracked.

As described above, in a case in which the line of sight function is in an available state, when the center button of MC65 is pressed, the determination processing at the viewed position is performed instead of the processing of returning the AF frame to the center, thereby realizing improvement of operability. Further, since the MC65 has the means for jumping to the viewed position and the means for fine adjustment, the two means are disposed at positions physically close to each other, and thus quick operation can be realized.

Also, although the example in which the MC 65 has the center button and the operation member for the direction-instructing operation has been described, the present invention is not limited thereto. As one aspect, it may be an operation member capable of switching between a direction-instruction operation and an operation unrelated to a direction. For example, a combination of a touch-move operation (a directional instruction) and a tap operation (an instruction having no relation to a direction) on the touch panel may be used, and a combination of a touch-move operation (a directional instruction) and a strong press (an instruction having no relation to a direction) on a pressure-sensitive touch panel may be used. Further, a combination of a pair of a direction-instructing operation member and a button located at a position surrounded by them such as the four-way key 74 and the SET button 75 may be used. In this case, the four-way key 74 and the SET button 75 can be regarded as one operation member. The pair of direction-instructing operations may be performed not only by the four-way key 74 but also by a rotary operation member.

Also, the MC65 is disposed at the position at which it is easily touched while holding the camera so that it can be easily operated at the time of shooting, but on the other hand, in the case of carrying the camera around, there is a concern of erroneous operation such as touching the camera unintentionally and changing the position of the AF frame. For this reason, in a default setting, a setting in which processing in response to an operation on the MC 65 is disabled during the shooting mode processing. However, if the line of sight function is available even in the disabled state, processing in response to an operation on the eight directions or on the center button of the MC 65 may be set to be available. That is, the system control unit 50 may be set such that the AF frame can be moved in response to the pressing of the center button if the line of sight function is available even though the movement of the AF frame in response to the pressing of the center button is unavailable if the line of sight function is unavailable.

It is possible to further improve operability of an electronic device that can receive an operation performed by a line of sight input.

Also, the above-described various controls that have been described as being performed by the system control unit 50 may be performed by one piece of hardware, and a plurality of pieces of hardware (for example, a plurality of processors and circuits) may share the processing to control the entire apparatus.

Also, although the present invention has been described in detail on the basis of the preferred embodiments, the present invention is not limited to these specific embodiments, and various embodiments within a range not departing from the gist of the present invention are also included in the present invention. Further, each of the above-described embodiments is merely an embodiment of the present invention, and the embodiments can be appropriately combined with each other.

Also, although the case in which the present invention is applied to a digital camera has been described as an example in the above-described embodiments, the present invention is not limited to this example and is applicable to any electronic device that can be operated by the line of sight input. That is, the present invention is applicable to a personal computer, a PDA, a mobile phone terminal, a portable image viewer, a print apparatus including a display, a digital photo frame, a music player, a game machine, an electronic book reader, and the like.

Also, the present invention is not limited to an imaging apparatus main body such as a digital camera, and may be also applicable to a control apparatus that communicates with an imaging apparatus (including a network camera) via a wired or wireless communication and remotely controls the imaging apparatus. Examples of the apparatus that remotely controls the imaging apparatus include apparatuses such as a smartphone, a tablet PC, and a desktop PC. The imaging apparatus can be controlled remotely by notifying the imaging apparatus of a command for performing various operations and settings from the control apparatus side on the basis of an operation performed on the control apparatus side and processing performed on the control apparatus side. In addition, a live view image captured by the imaging apparatus may be received via a wired or wireless communication and displayed on the control apparatus side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-193317, filed on Oct. 24, 2019, which is hereby incorporated by reference herein in its entirety.

What is claimed is:

1. An electronic device comprising:
at least one memory and at least one processor which function as:
a receiving unit configured to receive a line of sight input given by a line of sight of a user; and
a control unit configured to perform control such that,
1) in a first state in which designation of a position of a position index based on the line of sight input is unavailable, the position index is displayed at a predetermined position on a display in response to a first operation having been performed,
2) in a second state in which the designation of the position of the position index based on the line of sight input is available, the position index is displayed at a position based on the line of sight input on the display in response to the first operation having been performed, and
autofocus based on the position index is performed and shooting is performed by an image sensor.

2. The electronic device according to claim 1, wherein the control unit is further configured to move the position index in an instructed direction in response to a second operation for instructing a direction having been performed.

3. The electronic device according to claim 2, further comprising an operation member capable of receiving the first operation and the second operation.

4. The electronic device according to claim 1, wherein the predetermined position is a center position of a screen of the display.

5. The electronic device according to claim 1, wherein the predetermined position is a position that is independent of a position based on the line of sight input.

6. The electronic device according to claim 1,
wherein the at least one memory and the at least one processor further function as a setting unit capable of configuring a setting for disabling processing corresponding to the first operation having been performed, and
the control unit performs control such that, in the second state, even in a case in which the setting unit configures the setting for disabling, the position index is displayed at the position based on the line of sight input on the display in response to the first operation having been performed.

7. The electronic device according to claim 1,
wherein the electronic device is capable of being switched to a mode for detecting an object in an image displayed on the display, and
in a case in which the object is detected at the position at which the position index is displayed in response to the first operation having been performed in the mode for detecting the object, the control unit performs control to track the object.

8. The electronic device according to claim 7, wherein, in the mode for detecting the object and in a state of tracking the object, the control unit performs control to cancel the tracking without displaying the position index in response to the first operation having been performed.

9. The electronic device according to claim 7, wherein the object is a specific type of subject detected from an image captured by the image sensor.

10. The electronic device according to claim 1, wherein the position index is a frame that indicates an autofocus position.

11. The electronic device according to claim 1, further comprising the image sensor,
wherein the control unit performs control such that autofocus based on the position index is performed and shooting is performed by the image sensor.

12. A non-transitory computer readable medium that stores a program for causing a computer to function as the units of the electronic device according to claim 1.

13. A method of controlling an electronic device, the method comprising:
a step of receiving a line of sight input given by a line of sight of a user; and
a step of performing control such that,
1) in a first state in which designation of a position of a position index based on the line of sight input is unavailable, the position index is displayed at a predetermined position on a display in response to a first operation having been performed,
2) in a second state in which the designation of the position of the position index based on the line of sight input is available, the position index is displayed at a position based on the line of sight input on the display in response to the first operation having been performed, and
autofocus based on the position index is performed and shooting is performed by an image sensor.

14. An electronic device comprising:
at least one memory and at least one processor which function as:
a receiving unit configured to receive a line of sight input given by a line of sight of a user;
an operation member capable of receiving a first operation and a second operation which is for indicating a direction;
a control unit configured to perform control such that,
in a case in which designation of a position of a position index based on the line of sight input is available, the position index is displayed at a position based on the line of sight input on a display in response to the first operation having been performed on the operation member, and
autofocus based on the position index is performed and shooting is performed by an image sensor.

15. The electronic device according to claim 14,
wherein the electronic device is capable of being switched to a mode for detecting an object in an image displayed on the display, and
in a case in which the object is detected at the position at which the position index is displayed in response to the first operation having been performed in the mode for detecting the object, the control unit performs control to track the object.

16. The electronic device according to claim 15, wherein, in the mode for detecting the object and in a state of tracking the object, the control unit performs control to cancel the tracking without displaying the position index in response to the first operation having been performed.

17. The electronic device according to claim 15, wherein the object is a specific type of subject detected from an image captured by the image sensor.

18. A non-transitory computer readable medium that stores a program for causing a computer to function as the units of the electronic device according to claim 14.

19. A method of controlling an electronic device including an operation member capable of receiving a first operation and a second operation which is for indicating a direction, the method comprising:
  a step of receiving a line of sight input given by a line of sight of a user;
  a step of performing control such that, in a case in which designation of a position of a position index based on the line of sight input is available, the position index is displayed at a position based on the line of sight input on a display in response to the first operation having been performed on the operation member, and
  autofocus based on the position index is performed and shooting is performed by an image sensor.

* * * * *